United States Patent
Seen et al.

(10) Patent No.: US 9,971,175 B2
(45) Date of Patent: May 15, 2018

(54) DISPLAY DEVICE AND MOBILE TERMINAL

(71) Applicant: LG ELECTRONICS INC., Seoul (KR)

(72) Inventors: Seungmin Seen, Seoul (KR); Joonsung Sohn, Seoul (KR); Misook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 14/808,868

(22) Filed: Jul. 24, 2015

(65) Prior Publication Data

US 2016/0266302 A1    Sep. 15, 2016

(30) Foreign Application Priority Data

Mar. 12, 2015 (KR) .................. 10-2015-0034363

(51) Int. Cl.
| | | |
|---|---|---|
| *G02F 1/13* | (2006.01) | |
| *F21V 8/00* | (2006.01) | |
| *G02F 1/1335* | (2006.01) | |

(52) U.S. Cl.
CPC ......... *G02F 1/1323* (2013.01); *G02B 6/0046* (2013.01); *G02B 6/0048* (2013.01);
(Continued)

(58) Field of Classification Search
CPC .. G02B 6/0068; G02B 6/0046; G02B 6/0073; G02B 6/0048; G02B 6/0051;
(Continued)

(56) References Cited

U.S. PATENT DOCUMENTS

| | | | |
|---|---|---|---|
| 2006/0114267 A1* | 6/2006 | Park ..................... | G06F 1/3203 345/619 |
| 2011/0074737 A1* | 3/2011 | Hsieh ................... | G06F 3/0416 345/175 |

(Continued)

OTHER PUBLICATIONS

Robinson et al., "Intelligent Backlight: A Controllable Illumination System for High Efficiency and Sunlight Readable Mobile Displays," SID International Symposium, Digest of Technical Papers, vol. 45, Jun. 1, 2014, pp. 842-845, XP-55251430A.

*Primary Examiner* — Edward Glick
*Assistant Examiner* — Shan Liu
(74) *Attorney, Agent, or Firm* — Birch, Stewart, Kolasch & Birch, LLP

(57) ABSTRACT

A display device including a liquid crystal panel configured to selectively transmit light for each pixel of the liquid crystal panel; a light guide plate provided behind the liquid crystal panel; a light source array including a plurality of LEDs arranged in a row at first lateral side of the light guide plate, and configured to emit light to the first lateral side of the light guide plate; and a mirror provided in a second lateral side of the light guide plate and configured to reflect the light having reached the second lateral side back along the light guide plate. Further, a rear surface of the light guide plate includes a stepped unevenness having first surfaces configured to reflect light toward the liquid crystal panel and second surfaces configured to reflect light toward the mirror, and a thickness of the light guide plate increases in a first direction from the first lateral side to the second lateral side such that the second lateral side of the light guide plate is thicker than the first lateral side of the light guide plate.

9 Claims, 18 Drawing Sheets

(52) U.S. Cl.
CPC ......... *G02B 6/0051* (2013.01); *G02B 6/0055* (2013.01); *G02B 6/0068* (2013.01); *G02B 6/0073* (2013.01); *G02F 1/133615* (2013.01); *G02F 2001/133626* (2013.01)

(58) Field of Classification Search
CPC .... G02B 6/0055; G02B 6/0088; G02B 6/005; G02B 6/0083; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 21/0032; G02B 21/06; G02B 21/16; G02B 2006/12083; G02B 2006/12085; G02B 2006/12088; G02B 2006/1209; G02B 2006/12092; G02B 2006/12095; G02F 1/1323; G02F 1/133615; G02F 2001/133626; G02F 1/1336; G02F 2001/133607; G02F 2001/133616; G02F 1/133504; G02F 1/133308; G02F 2001/133317; G02F 2001/133322; G02F 1/133605; G01N 21/62; G01N 21/6458; B82Y 20/00

USPC ....................................... 349/61–67; 359/385
See application file for complete search history.

(56) References Cited

U.S. PATENT DOCUMENTS

| | | | |
|---|---|---|---|
| 2011/0304524 A1* | 12/2011 | Seen | H04M 1/22 345/55 |
| 2012/0315960 A1* | 12/2012 | Kim | H04W 52/0254 455/574 |
| 2013/0044511 A1* | 2/2013 | Motooka | G02B 6/0013 362/606 |
| 2013/0162611 A1* | 6/2013 | Lim | G09G 5/003 345/207 |
| 2014/0062309 A1* | 3/2014 | Kim | H05B 37/0227 315/132 |
| 2014/0240828 A1* | 8/2014 | Robinson | G02B 27/26 359/465 |
| 2015/0261284 A1* | 9/2015 | Lee | 713/323 |
| 2015/0365893 A1* | 12/2015 | Nobusawa | H04W 52/0235 455/574 |
| 2016/0034112 A1* | 2/2016 | Yoon | G06F 3/0481 715/768 |

\* cited by examiner

Secret Display Mode

Wide View Mode /Conventional

DISPLAY DEVICE AND MOBILE TERMINAL

CROSS-REFERENCE TO RELATED APPLICATIONS

This application claims priority to Korean Patent Application No. 10-2015-0034363 filed on Mar. 12, 2015 in Korea, the entire contents of which is hereby incorporated by reference in its entirety.

BACKGROUND OF THE DISCLOSURE

Field of the Disclosure

Embodiments of the present disclosure relate to a display device which can adjust the brightness of a display unit by adjusting the number of driving light sources and a mobile terminal including the display device.

Background of the Disclosure

Terminals can be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal can be embodied as a multimedia player or device.

As the mobile terminal is realized as a multimedia device, a function of a display unit provided in the mobile terminal is strengthened and the display unit is enlarged. Also, the mobile terminal is used when the display unit is activated. Accordingly, there is an immerging problem of large power consumption caused by the display unit and there are increasing needs for a display unit having reduced power consumption.

SUMMARY OF THE DISCLOSURE

Accordingly, an object of the present disclosure is to address the above-noted and other problems.

Another object of the present disclosure is to provide a display device which may adjust brightness of a display unit by adjusting the number of driving light sources and a mobile terminal.

To achieve these and other advantages and in accordance with the purpose of the present invention, as embodied and broadly described herein, the present invention provides in one aspect a display device including a liquid crystal panel configured to selectively transmit light for each pixel of the liquid crystal panel; a light guide plate provided behind the liquid crystal panel; a light source array including a plurality of LEDs arranged in a row at a first lateral side of the light guide plate, and configured to emit light to the first lateral side of the light guide plate; and a mirror provided in a second lateral side of the light guide plate and configured to reflect the light having reached the second lateral side back along the light guide plate. Further, a rear surface of the light guide plate includes a stepped unevenness having first surfaces configured to reflect light toward the liquid crystal panel and second surfaces configured to reflect light toward the mirror, and a thickness of the light guide plate increases in a first direction from the first lateral side to the second lateral side such that the second lateral side of the light guide plate is thicker than the first lateral side of the light guide plate. The present invention also provides a mobile terminal including the display device.

However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 7 and 8 are diagrams illustrating a passage of light when only a first LED of the backlight unit is turned on;

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above, in addition, these teachings may also be applied to stationary terminals such as digital TV, desktop computers, and the like.

Figure 1A:
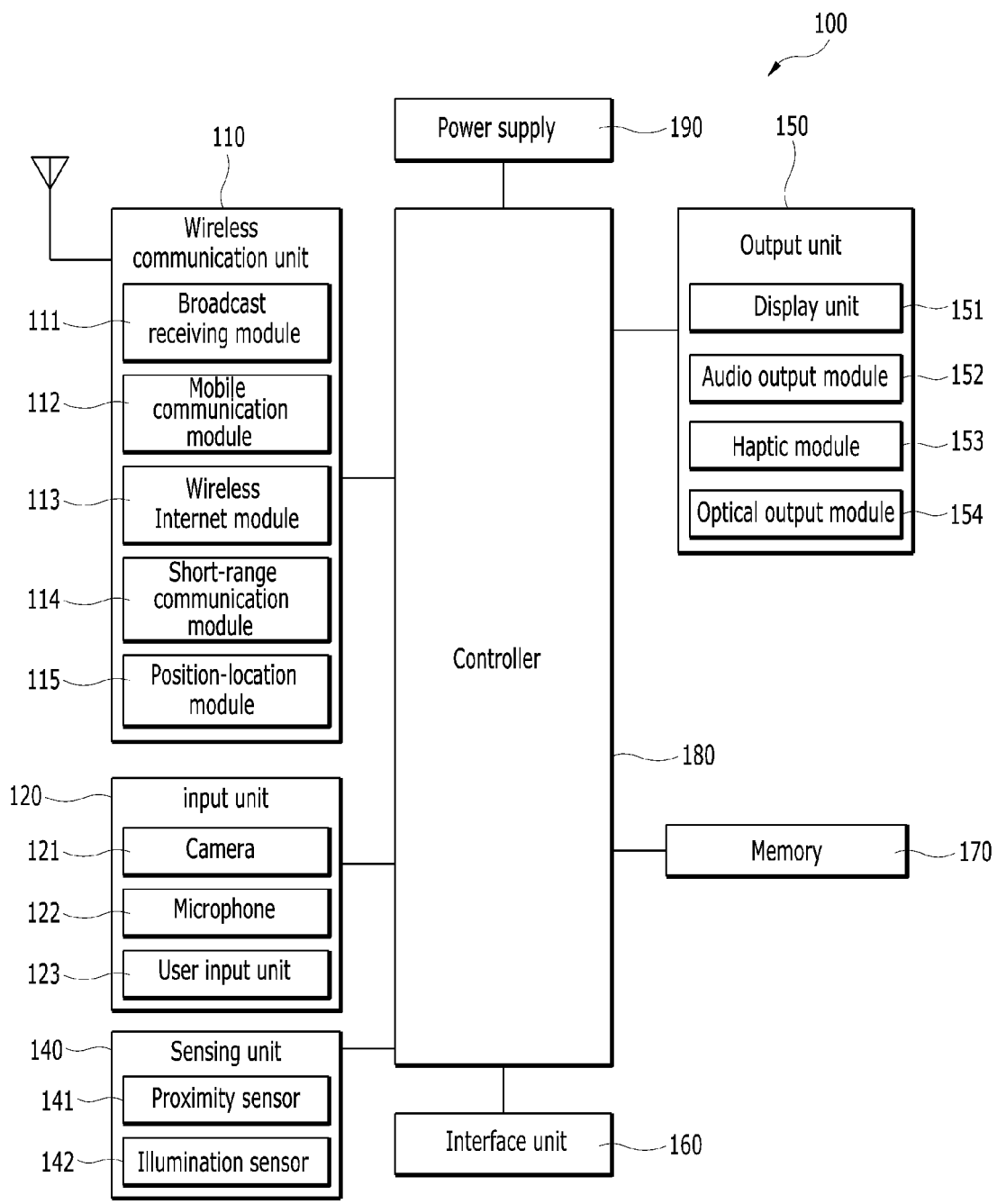
FIG. 1A is a block diagram of a mobile terminal in accordance with the present disclosure.
Figure 1B:
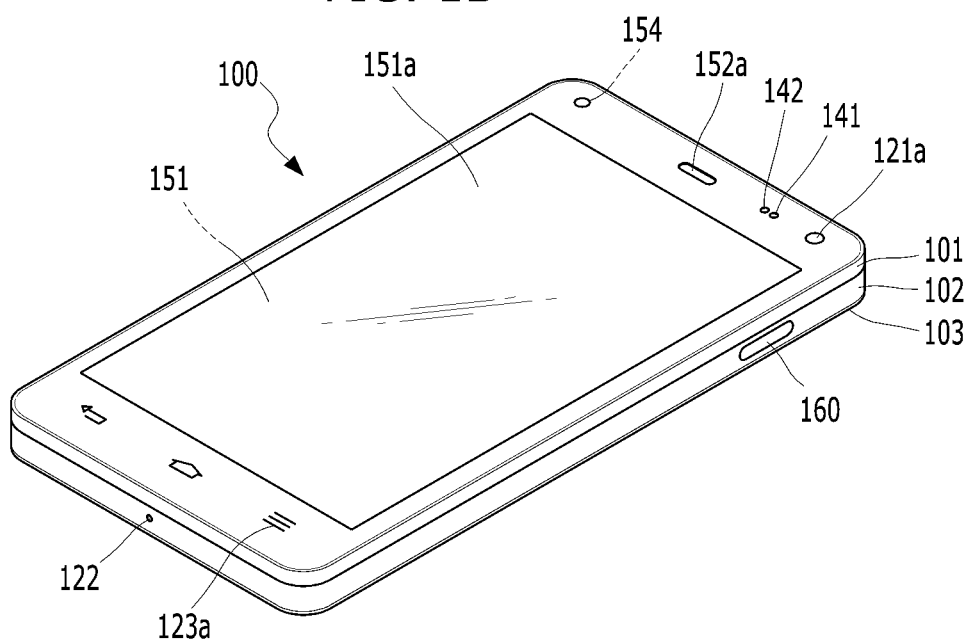
FIGS. 1B and 1C are conceptual views of one example of the mobile terminal, viewed from different directions.
Figure 1C:
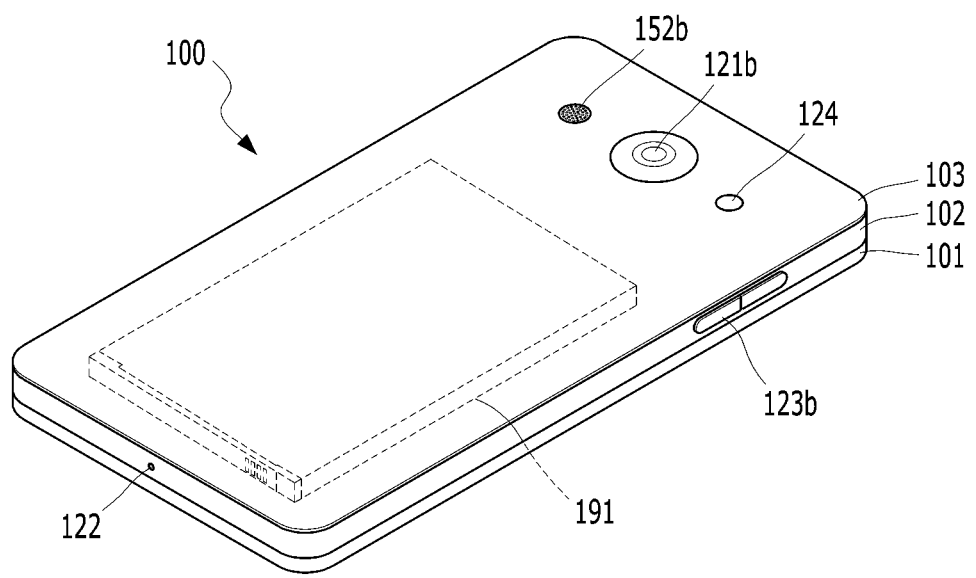

Reference is now made to FIGS. 1A-1C, where FIG. 1A is a block diagram of a mobile terminal in accordance with an embodiment of the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video 110 ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 170 and executed by the controller 180. Thus, the components shown in FIG. 1 have sufficient structure to implement the appropriate algorithms for performing the described functions.

Figure 2:
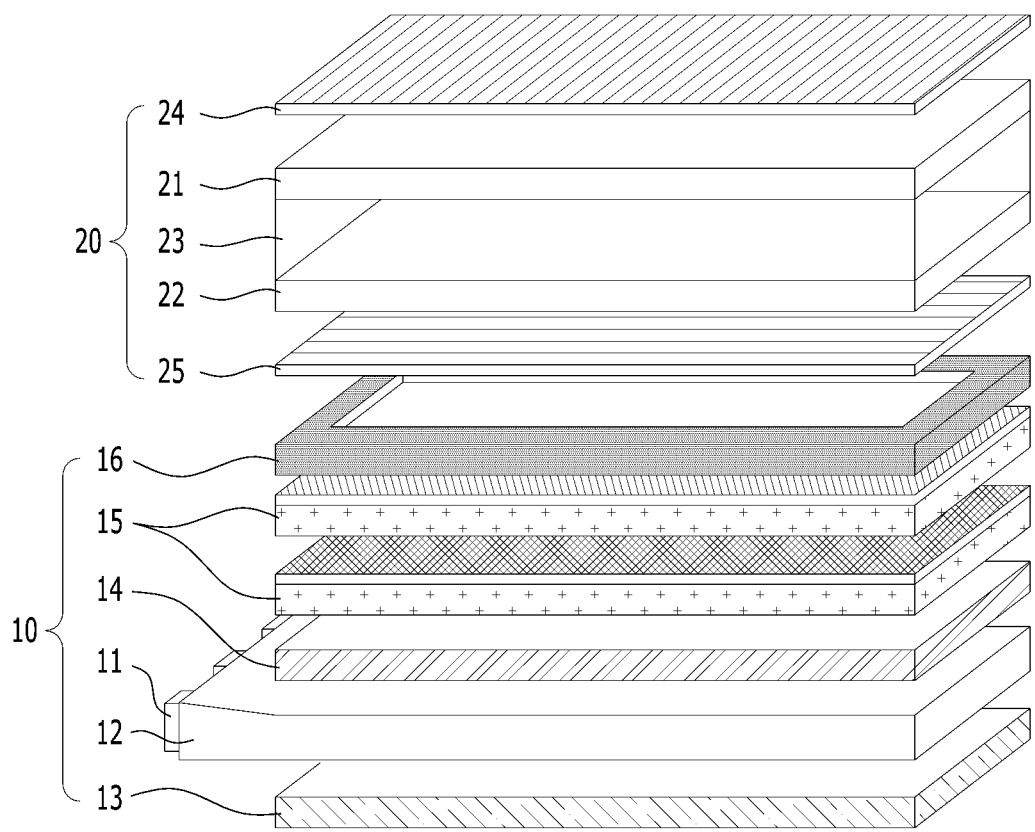
FIG. 2 is an exploded perspective diagram illustrating a related art display device.

FIG. 2 is an exploded perspective diagram illustrating a related art display device. As shown, the related art display device includes a liquid crystal panel 20 and a backlight unit 10. Liquid crystal 23 is injected between a pair of glass substrates 21 and 22 having transparent electrodes formed therein, respectively. When electric power is applied to the transparent electrodes, the molecule arrangement of the liquid crystal 23 is changed and the transparency is changed. When the liquid crystal 23 is transparent, the light supplied by the backlight unit 10 disposed behind the liquid crystal panel 20 passes through the liquid crystal 23. When the liquid crystal 23 is opaque, the light supplied by the backlight unit 10 does not pass through the liquid crystal. Using such a principle, an image is realized.

In addition, a color filter is provided in the glass substrate 21 to realize a color for each pixel for the display device and a transistor is provided in the other glass substrate 22 to apply the electric power each of the pixels selectively. As the liquid crystal panel 20 cannot emit light by itself, the backlight unit 10 is arranged in a rear surface of the liquid crystal panel to supply light. Polarizers 24 and 25 can also be provided as shown in FIG. 2.

As shown, the backlight unit 10 includes a light guide plate 12 provided in a rear surface of the liquid crystal panel 20 and one or more light sources configured to supply light from a first lateral side of the light guide plate 12 along a first direction. A plurality of LEDs are arranged in a row, adjacent to the light guide plate 12, to form a light source array 11.

The light supplied to the light guide plate 12 from the light source array 11 is reflected and diffused in the light guide plate 12, to be supplied to the liquid crystal panel 20 in front of the light guide plate 12. The light has to be uniformly diffused in the liquid guide plate 12 and uniformly supplied to the liquid crystal panel 20. For that, a diffusion sheet 14 and a prism sheet 15 may be further provided in front the liquid guide plate 12. A reflector 13 is also shown in FIG. 2. FIG. 2 also illustrates the prism sheet 15 to condense light from the light source by forming fine prism structures on a polymer film, for example, and illustrates a light block tape 16 to prevent light leaking from sides of the display device.

To output an image from the related art display device, all of the LEDs arranged in the light source array are driven, which causes a problem in that a large amount of power is consumed by the display device. The present disclosure improves the structure of the related art backlight unit and provides a novel backlight unit that drives a display device using a predetermined number of LEDs.

Figure 3:
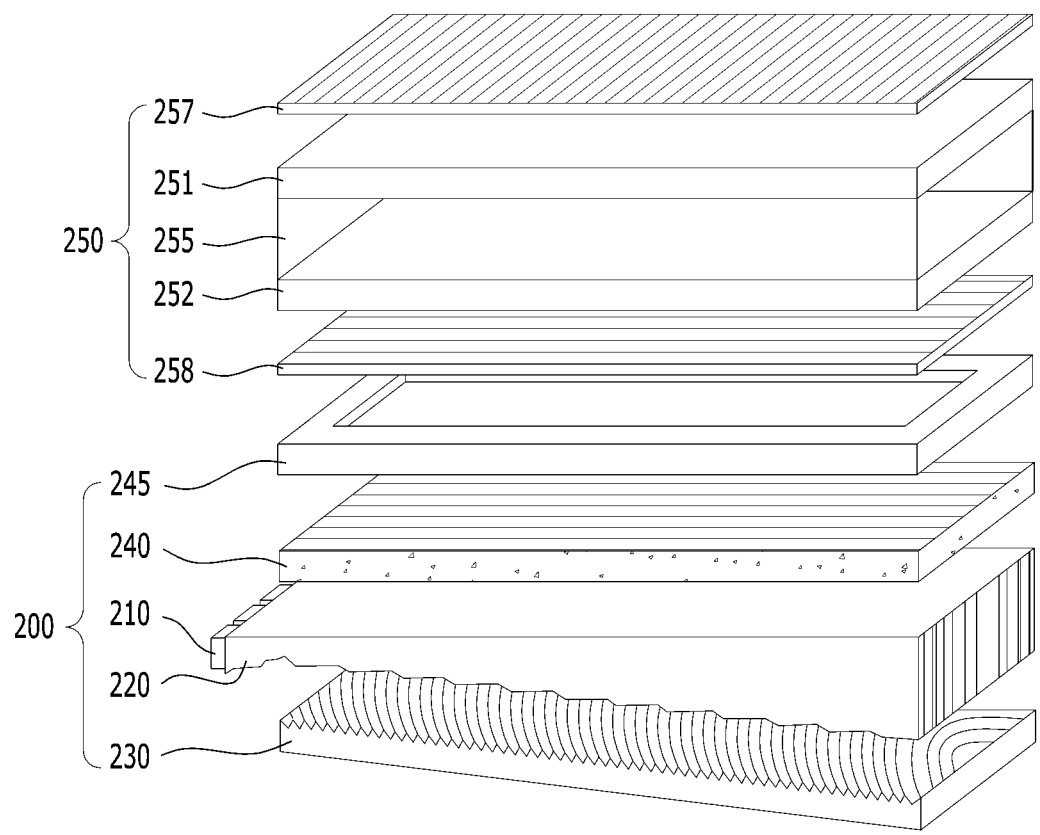
FIG. 3 is an exploded perspective diagram illustrating one embodiment of a display device in accordance with an embodiment of the present disclosure.
Figure 4:
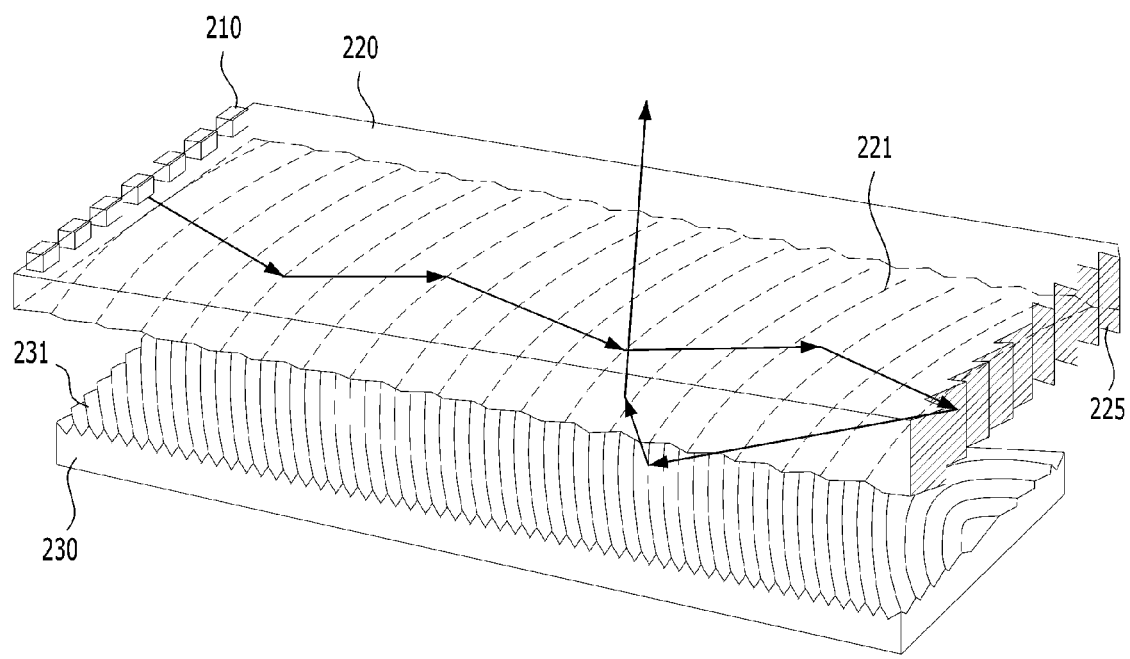
FIG. 4 is one embodiment of a backlight unit in accordance with an embodiment of the present disclosure.

In more detail, FIG. 3 is an exploded perspective diagram illustrating one embodiment of a display device (such as the display unit 151 shown in FIG. 1A) in accordance with an embodiment of the present disclosure, and FIG. 4 is an enlarged view illustrating only a liquid guide plate 220 and a reflector 230. As shown, the display device includes a liquid crystal panel 250 and a backlight unit 200. The liquid crystal panel 250 is similar to the liquid crystal panel provided in the related art display device mentioned above. For example, the liquid crystal panel 250 includes liquid crystal 255 between two glass substrates 251 and 252. Polarizers 257 and 258 are also shown in FIG. 3.

The backlight unit 200 in accordance with an embodiment of the present disclosure includes a light source array 210 and a light guide plate 220. The backlight unit 200 may further include a reflector 230 arranged behind the light guide plate 220 and a diffusion film 240 arranged in front of the light guide plate 220. FIG. 3 also illustrates a light blocking tape 245 to prevent light from leaking from sides of the display device. The light source array 210 having a plurality of LEDs arranged in first lateral side of the light guide plate 220 in a row can be used as a light source. In particular, the light source array 210 irradiates light to the lateral surface of the light guide plate 220. Out of the plurality of the LEDs 211, 212 and 213 (see FIG. 7), the first LED 211 is arranged in the center, the second LED 212 is arranged in right and left sides with respect to the first LED 211, and the third LED 213 is arranged in both ends of the light source array 210. A plurality of first LEDS, a plurality of second LEDS and a plurality of third LEDS can also be provided.

Further, the light source array 210 in accordance with an embodiment of the present disclosure can be controlled in bilateral symmetry. Specifically, the first LEDs 211, the second LEDs 212 and the third LEDs 213 can be controllable independently. In addition, a first mode can correspond to only the first LEDs 211 being turned on and a second mode can correspond to the first and second LEDs 211 and 212 being turned on. Also, a third mode can correspond to all of the LEDs being turned on. The number of the turned-on LEDs 211, 212 and 213 can also be different. Further, in the third mode, the power consumption is the largest and in the first mode, the power consumption is the smallest.

Figure 5:
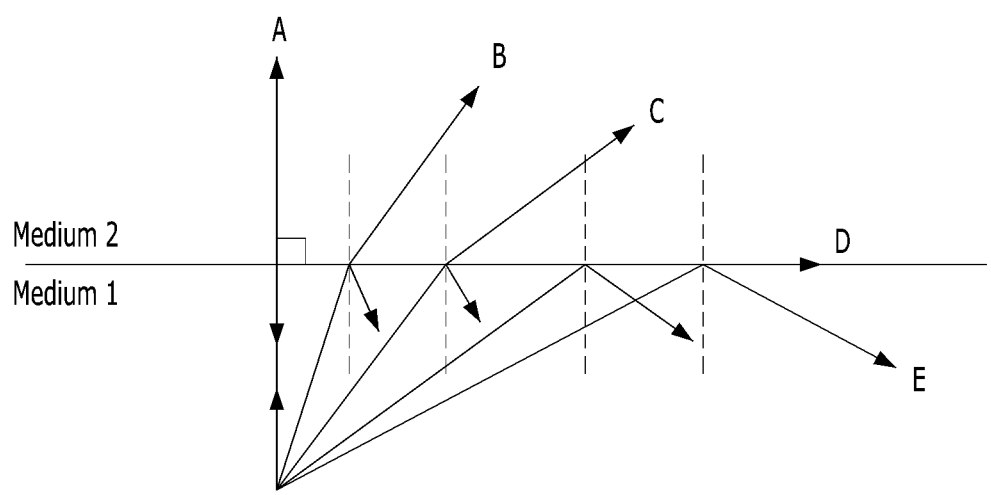
FIG. 5 is a diagram illustrating total reflection.

In addition, the light guide plate 220 is configured to diffuse the light incident on the lateral surface uniformly, using total reflection, to make the light a surface-light source and to supply the surface-light source to the liquid crystal panel 250. FIG. 5 is a diagram illustrating the concept of total reflection. In particular, 'A' means that an incident angle of light is zero (0). 'B' and 'C' mean the incident angle is smaller than a critical angle, and 'D' and 'E' mean the incident angle is larger than a critical angle.

The total reflection means that the light incident at a critical angle or more is reflected totally, not passing through a medium with a low refractive index, when light is incident on a medium with a low refractive index from a medium with a high refractive index (i.e., Medium 1). When light is incident at a smaller angle than the critical angle, some of the light pass from Medium 1 to Medium 2 in A, B and C and some of the light is reflected in a border surface between Medium 1 and Medium 2. When the light is incident at a larger angle than the critical angle, all of the light is reflected in the boarder surface between Medium 1 and Medium 2 in D and E.

The light incident on one lateral surface of the light guide plate 220 reaches a front surface or a rear surface of the light guide plate 220 at a larger angle than the critical angle and then is reflected totally to reach the other surface. As shown in FIG. 4, a mirror 225 is printed on the other lateral surface of the light guide plate 220 and the light having reached the other lateral surface of the light guide plate 220 is reflected again. When the light reaches the front surface or rear surface of the light guide plate 220 at a smaller angle than the critical angle of the light guide plate 220, the light passes through the light guide plate 220 and it is emitted after that as shown in FIG. 4.

In other words, the light incident on the front surface of the light guide plate 220 at a smaller angle than the critical angle passes through the light guide plate 220. Further, light is forwardly reflected by the reflector 230 arranged behind the light guide plate 220 to pass through the light guide plate 220 to the liquid crystal panel 250.

Especially, the light guide plate 220 in accordance with an embodiment of the present disclosure has a stepped unevenness formed in the rear surface thereof and the stepped unevenness includes a plurality of surfaces. As shown in FIG. 4, the stepped unevenness is formed in a first direction (a direction from one side of the light guide plate 220 to the other side or from the light source array 210 to the mirror 225) and it has a continuous surface in a second direction (a vertical direction with respect to the first direction). In other words, steps are formed in the first direction like stairs and a curved surface is formed in the second direction. In the stepped unevenness 221, angles between two neighboring surfaces are different from each other and first directional lengths of the surfaces are different from each other.

Figure 6:
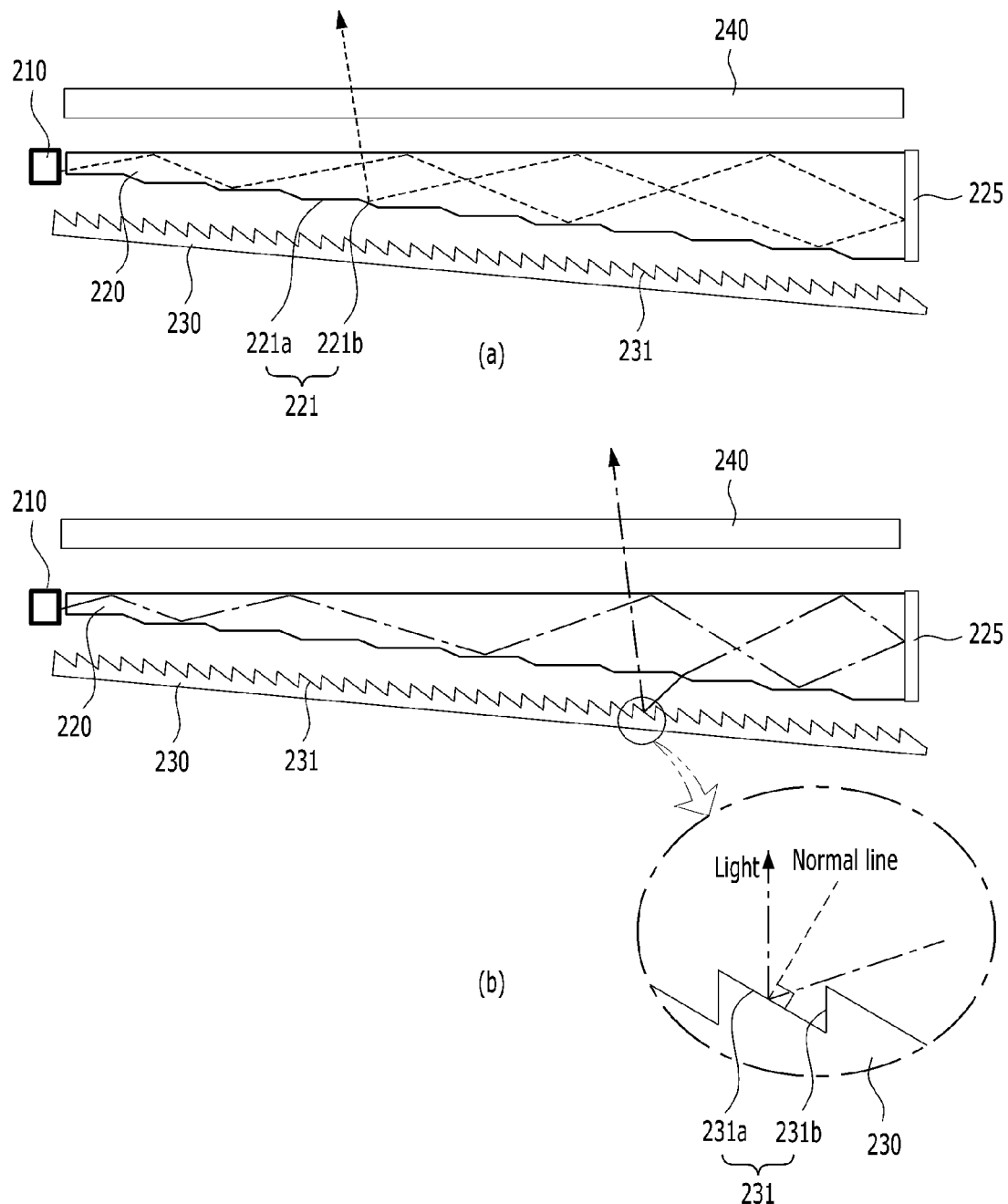
FIG. 6 is a diagram illustrating a passage of light incident on a first lateral side of a light guide plate from a first LED along the light guide plate.

As shown in FIG. 6, a first surface 221a formed at a first angle and a second surface 221b formed at a second angle are repeatedly arranged in the stepped unevenness 221. The first surface 221a can be flat or inclined toward the light source (one lateral surface of the light guide plate 220), and the second surface 221b is toward the mirror 225 (the other lateral surface of the light guide plate 220). Accordingly, when the light incident on the lateral surface of the light guide plate 220 from the light source reaches the first surface 221a, the incident angle of the light is smaller than the critical angle and it is reflected to reach the mirror 225 arranged in the other lateral surface of the light guide plate 220.

When it reaches the first surface 221a, the light reflected in the mirror 225 is reflected. When it reaches the second surface 221b, the light is incident at an angle smaller than the critical angle and then the light passes through the light guide plate 220 to the reflector 230 arranged behind the light guide plate 220. When it reaches the second surface 221b, the light is incident at the critical angle or more and then the light is reflected to the front surface of the light guide plate 220 and is supplied to the liquid crystal panel 250.

As there is a difference between angles formed by the first surface 221a and the second surface 221b, the second lateral side of the light guide plate 220 is thicker than the first lateral side of the light guide plate 220. Further, the rear surface of the light guide plate 220 is projected more toward the second surface of the light guide plate 220 and the thickness of the light guide plate 220 can be differentiated according to the first direction length and the angle of each surface 221a, 221b forming the stepped unevenness 221.

In a related art light guide plate, a portion where the light source array is arranged is thicker than or as thick as the other portion. Specifically, the related art light guide plate is formed to reflect the light incident in the rear surface from the light source array and to emit the light to the front surface after that. However, the first second lateral side of the light guide plate 220 in accordance with an embodiment of the present disclosure is thicker than the first lateral side and most of the light travels to the mirror 225 arranged in the second lateral side of the light guide plate 220. Then, the light reflected in the mirror 225 is reflected in the stepped unevenness 221 formed in the rear surface of the light guide plate 220 and is emitted to the front surface of the light guide plate.

In more detail, FIG. 6 illustrates a passage of the light incident on the first lateral side of the light guide plate 220 from the first LED 211 along the light guide plate 220. The light is totally reflected in the front surface and the rear surface of the light guide plate 220 and it travels to the second lateral side of the light guide plate 220. After that, the light having reached the second lateral side of the light guide plate is reflected and it travels to the portion of the light guide plate 220 again.

When the light traveling to the second lateral side of the light guide plate 220 after emitted from the light source or the light traveling to the first lateral side of the light guide plate 220 after reflected in the mirror 225 is incident on the front surface of the light guide plate 220 at the critical angle or less, the light is emitted to the front surface of the light guide plate 220 as shown in FIG. 6 (a) and incident on the liquid crystal panel 250 arranged in front of the light guide plate 220. In addition, the diffusion film 240 can be provided in front of the light guide plate 220 to supply the light incident on the liquid crystal panel 250 as the surface light source. The diffusion film 240 preferably has a low diffusion coefficient to secure brightness of the display device 151.

Meanwhile, when the light is incident on the rear surface of the light guide plate 220 at an angle smaller than the critical angle, the light passes through the light guide plate 220 and reaches the reflector 230 arranged behind the light guide plate 220 as shown in FIG. 6 (b). The light reflected by the reflector 230 passes through the light guide plate 220 and it is supplied to the liquid crystal panel 250 disposed in front of the light guide plate 220. In addition, unevenness 231 is formed in the reflector 230 to reflect the light at a small incident angle when the light having reached the reflector 230 is emitted to the front surface of the light guide plate 220.

Further, only the light incident on the stepped unevenness 221 formed in the rear surface of the light guide plate 220 at a smaller angle than the critical angle passes through the light guide plate 220 and reaches the reflector 230. In other words, an angle of the light incident on the reflector 230 is determined to be within a predetermined range of angles (θ). Accordingly, the light incident within the range of the angles (θ) is reflected by the reflector 230 and a plurality of unevennesses 231 having surfaces 231a and 231b inclined at a preset angle as shown in FIG. 6(b) are formed in the reflector 230 to make the reflected light be incident on the liquid crystal panel almost vertically (at a small incident angle).

Figure 7:
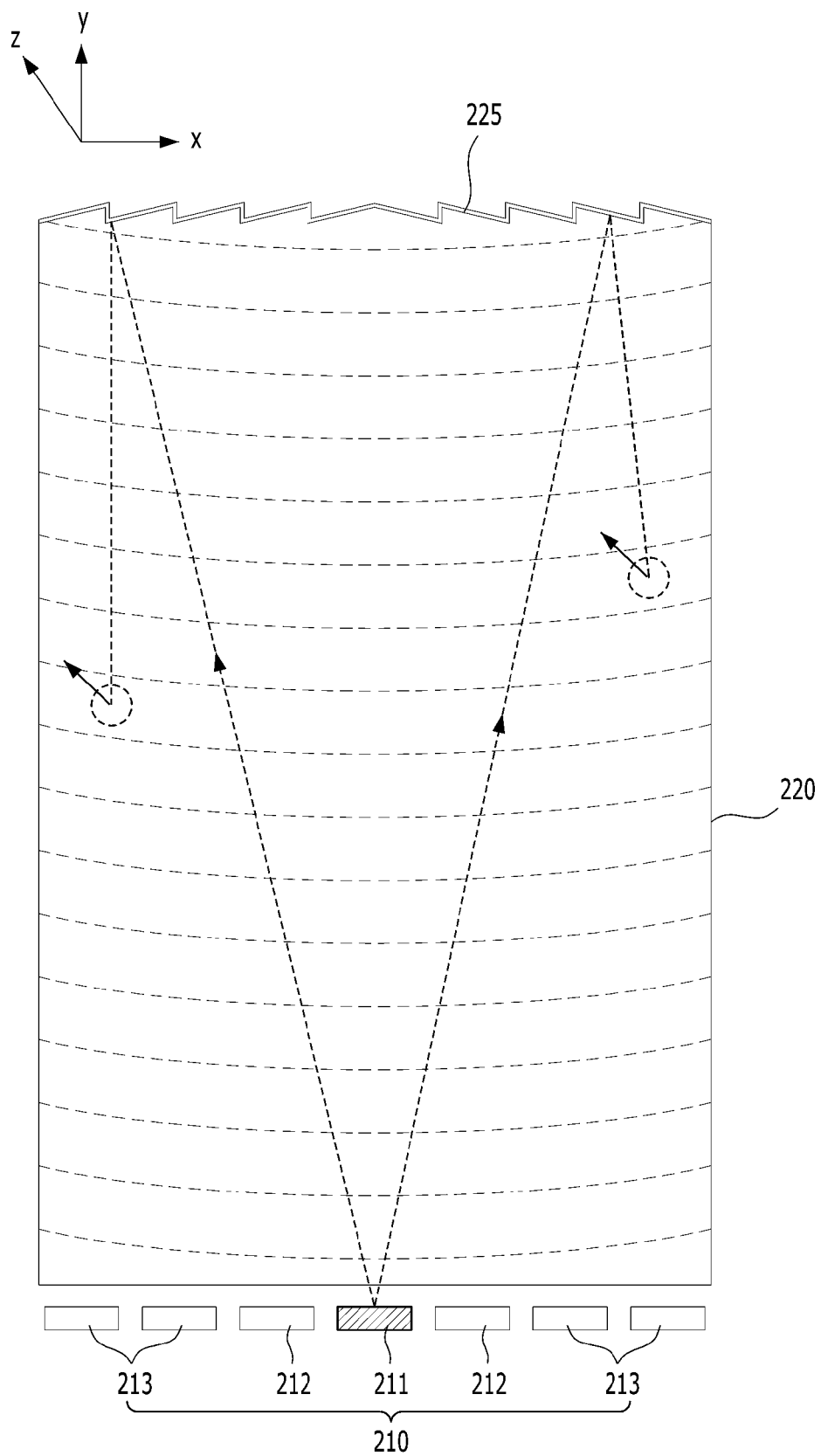
Figure 8:
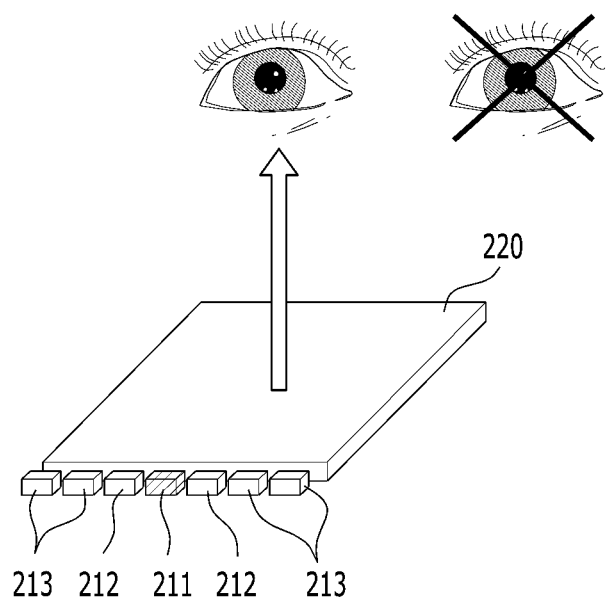

Next, FIGS. 7 and 8 are diagrams illustrating a passage of light when only a first (central) LED of the backlight unit 200 is turned on. In particular, FIGS. 7 and 8 are plane views of FIG. 6. A first direction is a y-axis direction and a second direction is an x-axis direction, and a direction along the thickness of the light guide plate 220 (a third direction) is a z-axis direction.

The light emitted from the first LEDs 211 is diffused in a fan shape to be incident on one lateral surface of the light guide plate 220. Further, the light incident from the first LEDs 211 is reflected in the front surface and the rear surface of the light guide plate 220 to reach the mirror 225. Even when it is reflected in the direction along the thickness of the light guide plate 220 (the third direction, in other words, the z-axis direction in the drawing), the light is diffused in a fan shape in the first direction as shown in FIG. 7 and the first LEDs are arranged in a center of the second direction. Accordingly, the light travels in the second direction symmetrically. Also, an inclined surface symmetrical to the second direction can be formed as shown in FIG. 7 to make an incident angle of the light emitted from the first LED similar to an angle of the light when the light emitted from the first LEDs 211 is incident on the mirror 225.

It is also preferably that the other lateral surface of the light guide plate 220 where the mirror 225 is formed is formed in a Fresnel shape. That is, to make the light emitted from the first LEDs 211 reach the mirror 225 at the same angle, the mirror 225 has to be a concave mirror concave with respect to the first LEDs 211. The Fresnel means a mirror divided into stepped portions to reduce the thickness of the concave mirror. In more detail, Fresnel is generally applied to a convex lens and can be applied to the mirror 225 formed in a concave shape in accordance with an embodiment of the present disclosure.

In addition, the light reflected in the mirror 225 reaches the second surface 221b of the stepped unevenness 221 formed in the rear surface of the light guide plate 220 and is then reflected, or reflected by the reflector 230 and emitted in the third direction (the z-axis direction). An angle of the emitted light is small in a normal line and the light is emitted almost forwardly. To emit the light reflected in the mirror 250 forwardly, the light guide plate 220 may be formed in a convex arc shape convex in a direction to the second lateral side of the light guide plate 220 shown in FIG. 7 and then the inclined surfaces of the stepped unevenness 221 are spaced apart the same distance from each other at the same angle.

As shown in FIG. 8, the light emitted from the first LED 211 is emitted vertically to the light guide plate 220 and a person located in front of the light guide plate 220 can easily see the light. However, since the light supplied from the backlight unit 200 is small, a person viewing the mobile terminal from the side cannot see the light easily.

Figure 9:
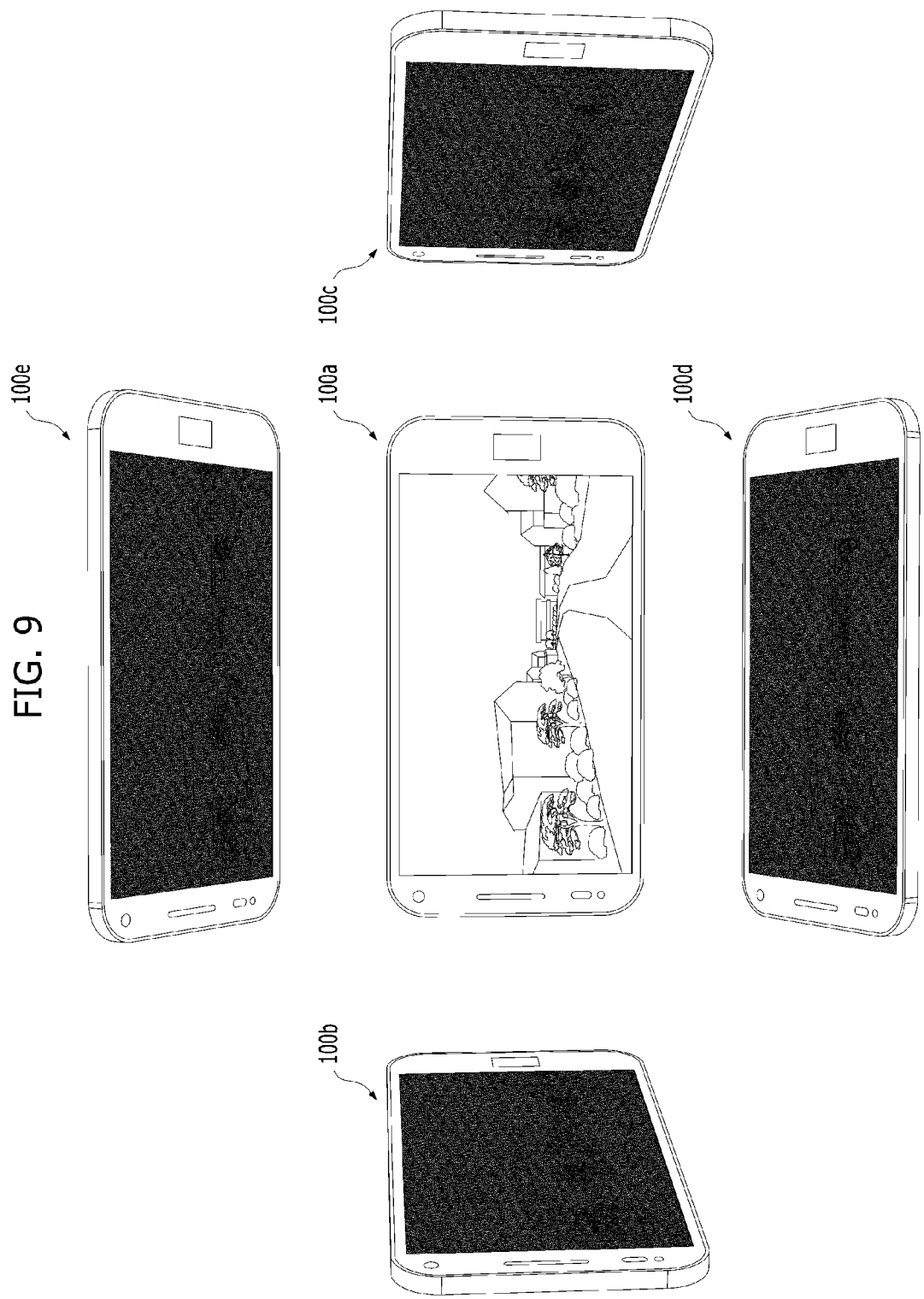
FIG. 9 is a diagram illustrating a screen according to a view angle for a user watching the display device in a state of FIG. 7.

Next, FIG. 9 is a diagram illustrating a screen according to a view angle for a user watching the display device in a state of FIG. 7. When watching the display unit placed in a vertical direction when driving only the first LEDs 211 (100a), the user can see a clear image. When tilting the display unit obliquely (100b, 100c, 100d and 100e), the user cannot see the image very well. Further, when driving only the first LEDs 211, the user located at an oblique angle with respect to the surface of the display unit cannot see the image and that status can be a secret display mode (a first mode). In the secret display mode, only the first LEDs 211 are driven and power consumption is reduced.

Figure 10:
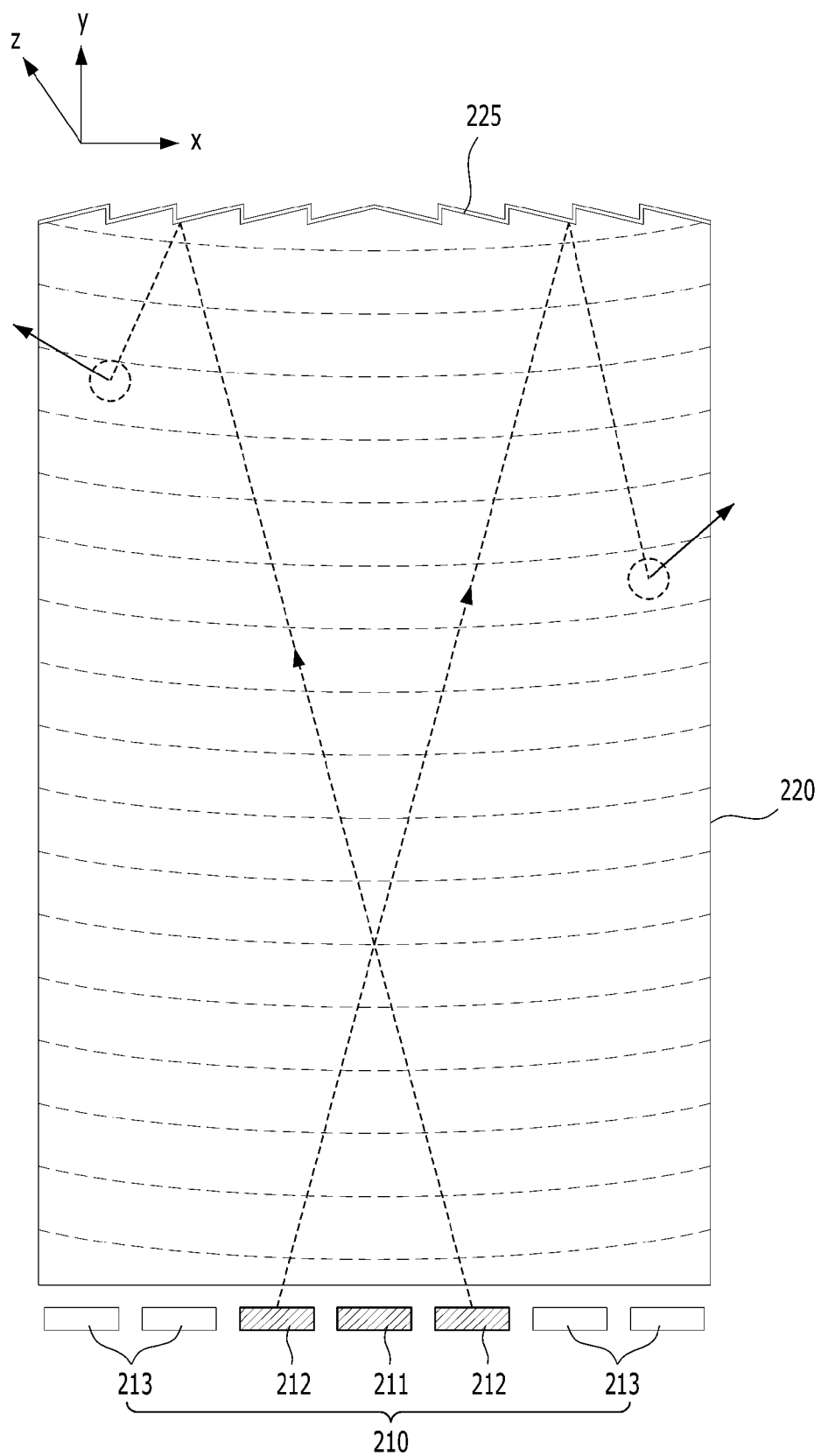
FIGS. 10 and 11 are diagrams illustrating a passage of light when some light sources provided in the backlight unit are turned on in accordance with an embodiment of the present disclosure.
Figure 11:
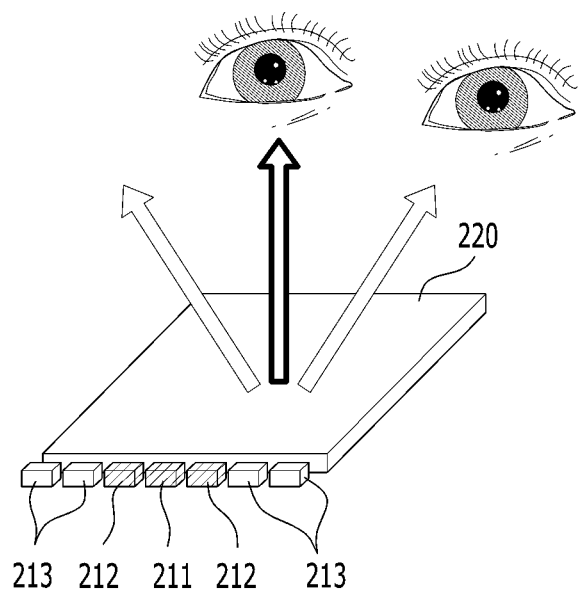

Next, FIGS. 10 and 11 are diagrams illustrating a passage of light when more light sources provided in the backlight unit 200 are driven in accordance with an embodiment of the present disclosure. In particular, FIGS. 10 and 11 illustrate that the second LEDs 212 arranged in right and left portions with respect to the first LEDs 211 are turned on together with the first LEDs 211. Further, the light of the first LEDs 211 travels along the passage shown in FIG. 7. However, the second LEDs 212 are not arranged in the center of the second direction and the light is emitted in a fan shape from the second LEDs 212.

Accordingly, the light emitted from the second LEDs 212 is incident on the mirror 225 at different angles according to the emitted positions. Thus, the angle of the light emitted to the front surface of the light guide plate 220 after being reflected in the second surface 221b of the rear surface of the light guide plate 220 or in the reflector 230 can be in a larger range of angles than the angle of the emitted light shown in FIG. 7. In this instance, a predetermined size or more of brightness can be secured to allow the user see the image even when the user watches the display unit in front and obliquely as shown in FIG. 1I. This can be called the Power Save Mode.

Figure 12:
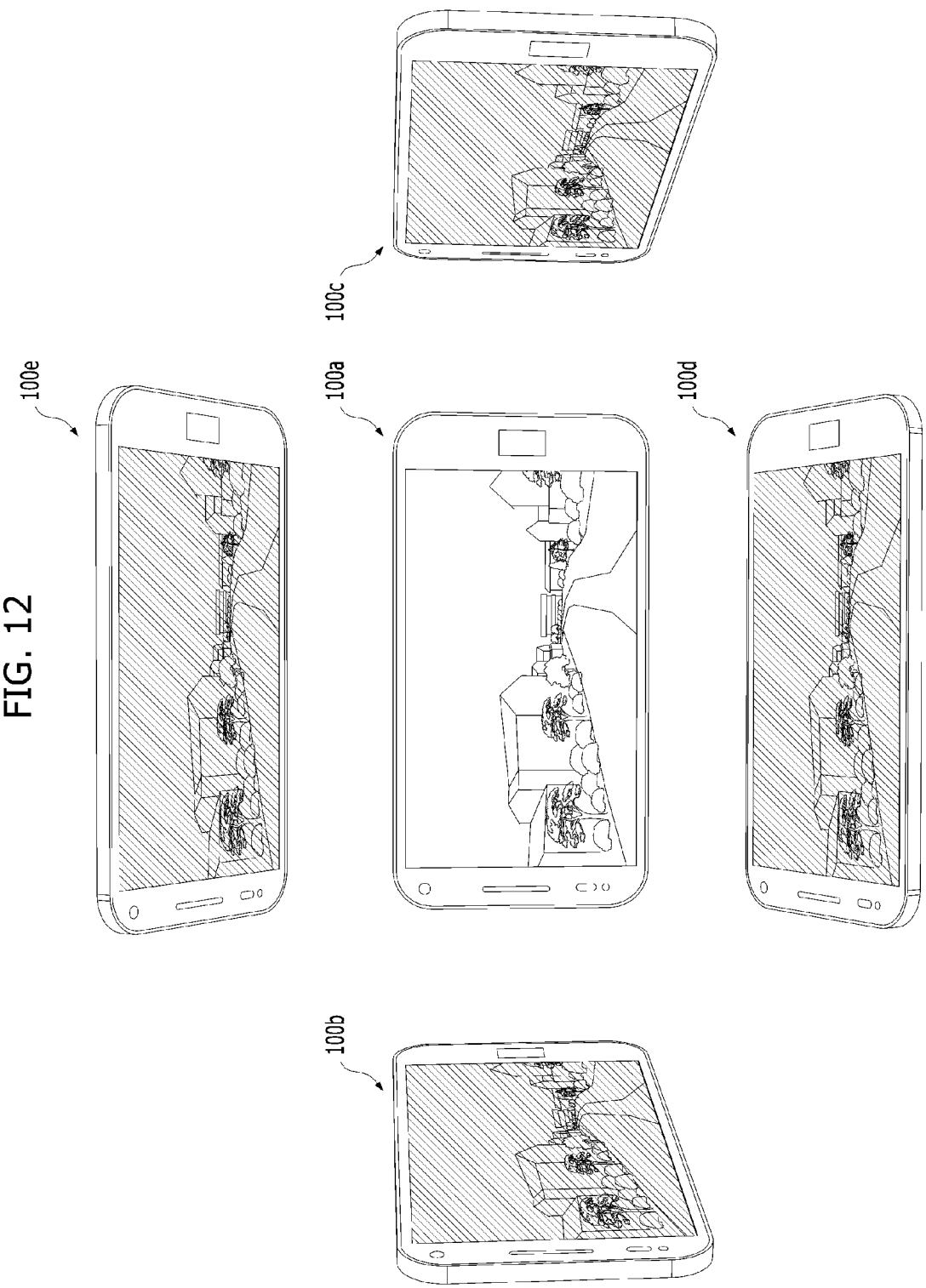
FIG. 12 is a diagram illustrating a screen according to a view angle for a user watching the display device in a state of FIG. 10.

Next, FIG. 12 is a diagram illustrating, a screen according to a view angle for a user watching the display device 151 in a state of FIG. 10. As shown in FIG. 12, the user can see the screen even when tilting the mobile terminal 100. As shown in FIG. 12, when the mobile terminal is tilted, the brightness is degraded. However, only some light sources are driven, and thus this can be called the power save mode (a second mode).

Figure 13:
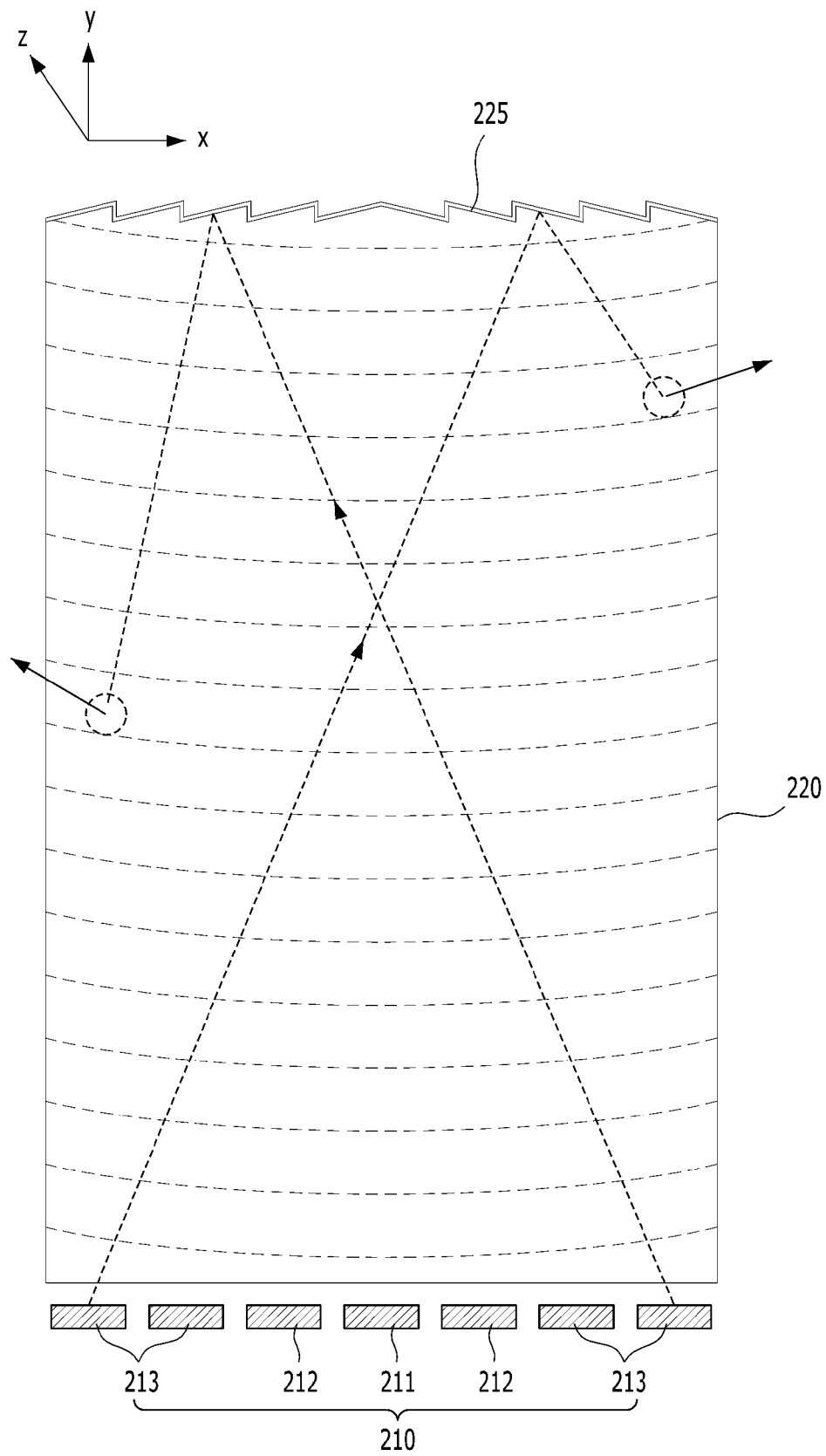
FIGS. 13 and 14 are diagrams illustrating a passage of light when all of the light sources provided in the backlight unit are turned on in accordance with an embodiment of the present disclosure.
Figure 14:
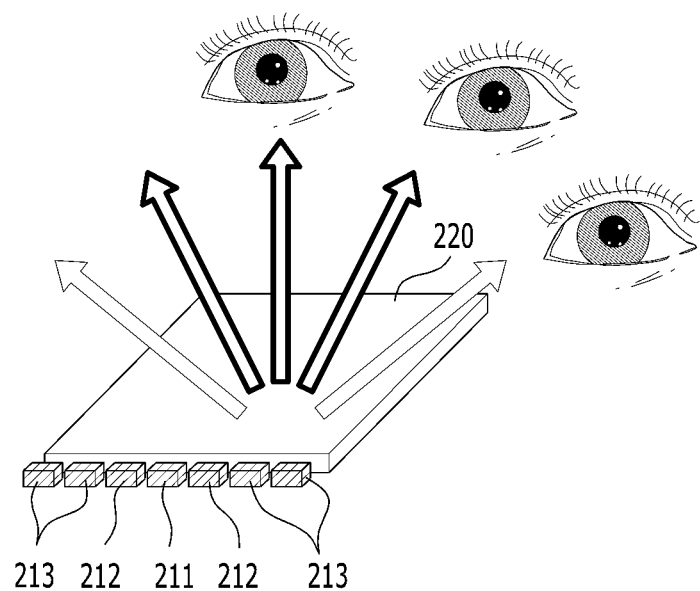
Figure 15:
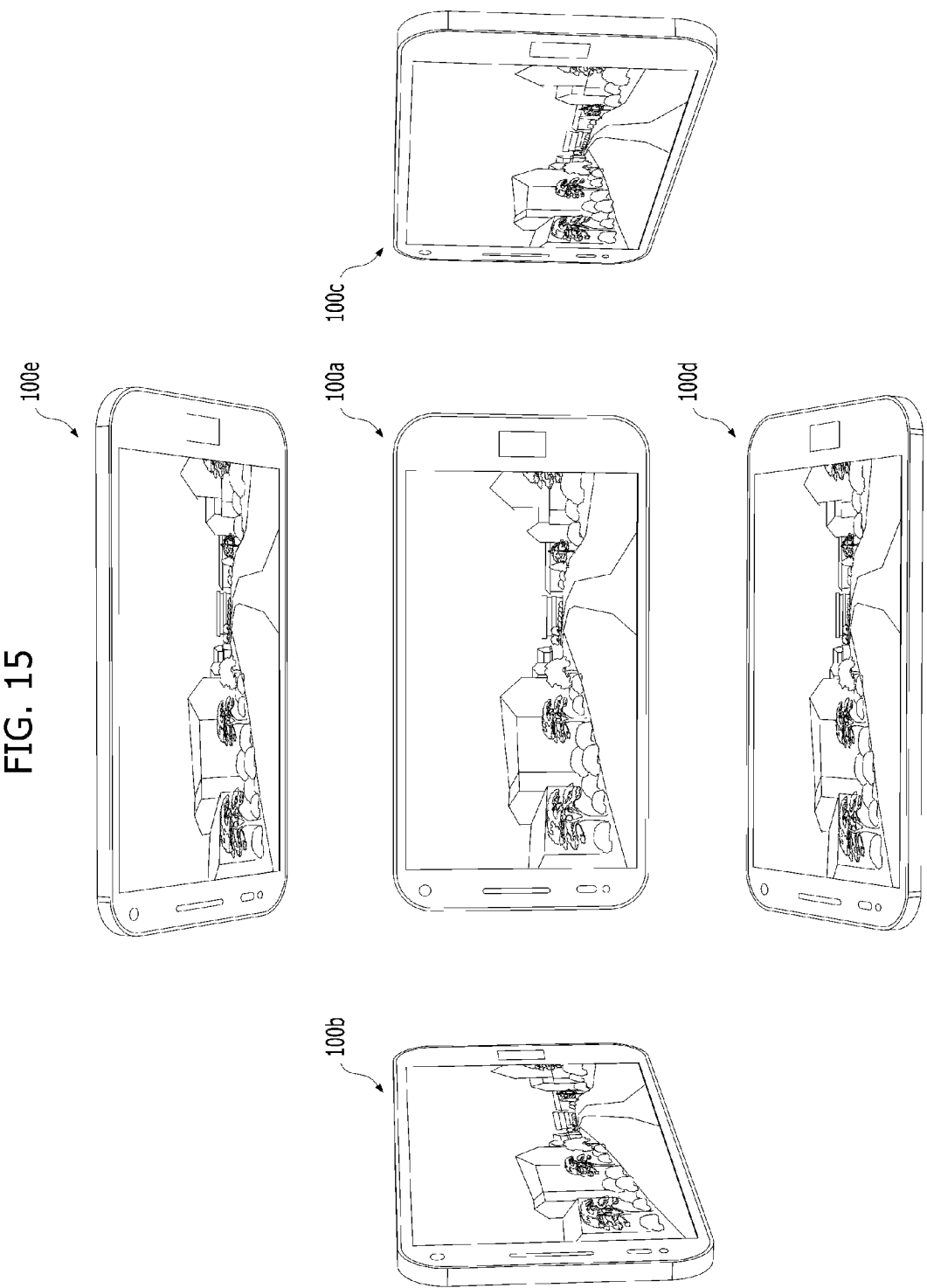
FIG. 15 is a diagram illustrating a view angle for a user watching the display device in a state of FIG. 13.

Next, FIGS. 13 and 14 are diagrams illustrating a passage of light when all of the light sources provided in the backlight unit are driven in accordance with an embodiment of the present disclosure. In addition, FIG. 15 is a diagram illustrating a view angle for a user watching the display device 151 in a state of FIG. 13.

When not only the first LEDs 211 and the second LEDs 213 but also the third LEDs 213 arranged in both end portions with respect to the second direction are driven, incident angles of the light can be diversified more than the incident angles of the light when only the first LEDs 211 and the second LEDs 213 are driven. Accordingly, the angles of the light emitted forwardly can be within a wider range of angles with respect to the z-axis direction shown in FIG. 14. Accordingly, even the user located at an oblique angle can appreciate a sufficiently bright screen shown in FIG. 15. The user can appreciate the screen at a wide angle and this state where all of the LEDs are turned on may be a wide view mode (a third mode).

Figure 16:
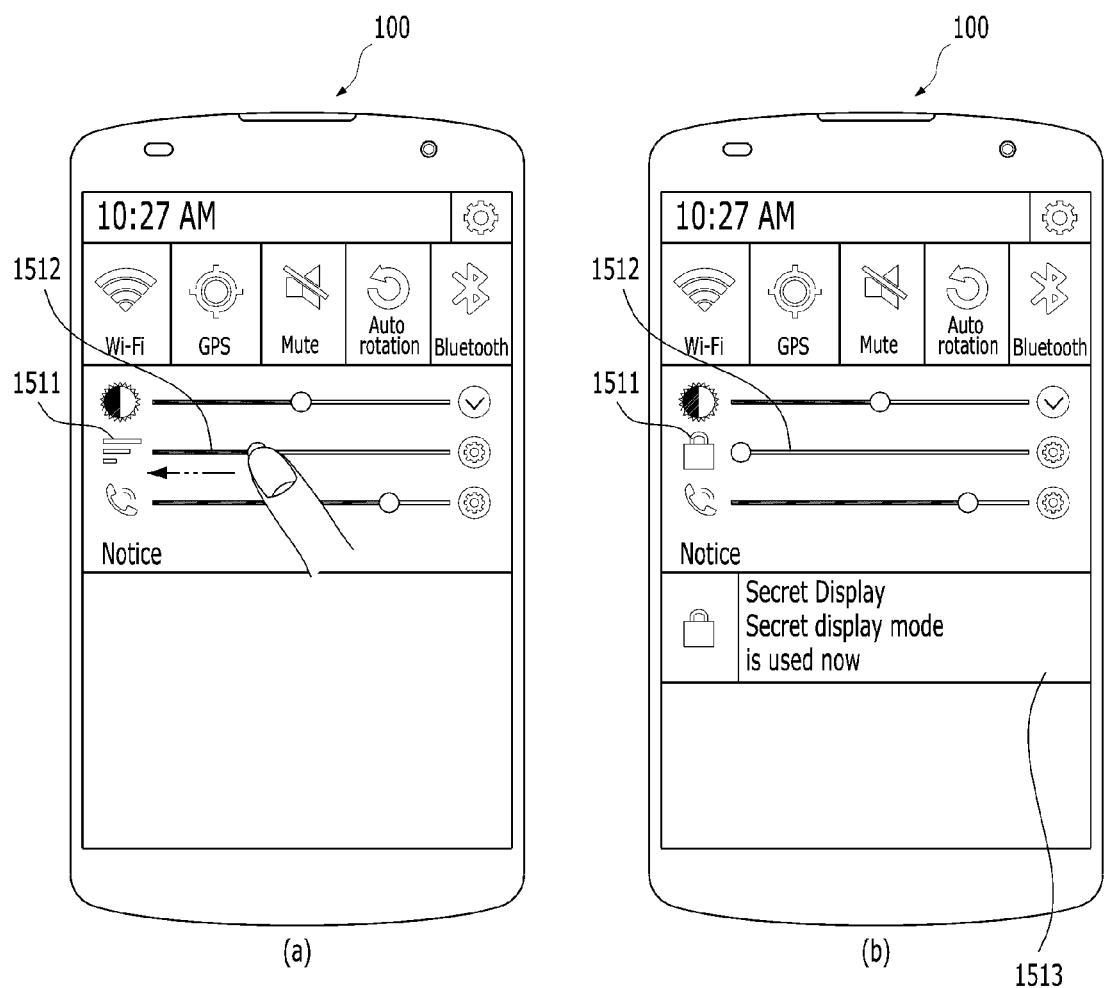
FIG. 16 is a diagram illustrating a screen of the mobile terminal in accordance with an embodiment of the present disclosure to adjust a brightness of the display unit.

Next, FIG. 16 is a diagram illustrating a screen of the mobile terminal 100 in accordance with an embodiment of the present disclosure to adjust brightness of the display unit. The number of the driving LEDs is adjusted so that the brightness of the screen can be adjusted and a view angle can be adjusted. In other words, when the number of the driving LEDs is reduced, the screen mode is implemented. As the number of the driving LEDs is increased, the power save mode is converted into the wide view mode. In addition, the current mode can be selected from the three modes. While driving the plurality of the light sources sequentially, there can be several steps specified. When there are specified steps, a state bar 1512 shown in FIG. 16 can be used to adjust the brightness of the screen. Alternatively, the secret display mode, the power save mode or the wide view mode can be displayed, using an additional icon 1511, or a notice message window 1513 may be provided to the user.

As mentioned above, the mobile terminal in accordance with an embodiment of the present disclosure can secure the brightness of the screen in front by driving a small number of light sources. Accordingly, the power consumption can be reduced and hours of battery use may be increased. Furthermore, the mobile terminal can be used in the secret display mode, without an auxiliary security film, and can be used for information security or normal use according to various embodiments. Accordingly, the user's convenience is enhanced.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a case;
a display device provided in a front surface of the case;
a wireless communication unit configured to provide wireless communication; and
a controller configured to control a light source of a backlight unit of the display device,
wherein the display device includes:
a liquid crystal panel configured to selectively transmit light for each pixel of the liquid crystal panel;
a light guide plate provided behind the liquid crystal panel;
a light source array including a plurality of LEDs arranged in a row at a first lateral side of the light guide plate, and configured to emit light to the first lateral side of the light guide plate; and
a mirror provided in a second lateral side of the light guide plate and configured to reflect the light having reached the second lateral side back along the light guide plate,
wherein a rear surface of the light guide plate includes a stepped unevenness having first surfaces inclined at a first angle and configured to reflect light toward the liquid crystal panel and second surfaces inclined at a second angle and configured to reflect light toward the mirror, and
wherein a thickness of the light guide plate increases in a first direction from the first lateral side to the second lateral side such that the second lateral side of the light guide plate is thicker than the first lateral side of the light guide plate,
wherein the light source array comprises a first LED arranged in a center of a portion of the light guide plate and a second LED arranged on right and left sides of the first LED, and
wherein the controller is further configured to:
control the display device to display a status bar for adjusting a number of turning on/off LEDs of the display device to input a user command for both changing and showing a display mode of the display device in an user interface, the display mode includes a secret display mode, a power save mode and a wide view mode;
turn on only the first LED when the user interface indicates the secret display mode;
turn on the first LED and the second LED when the user interface indicates the power save mode; and
turn on all of the LEDs arranged in the light source array when the user interface indicates the wide view mode.

2. The mobile terminal of claim 1, wherein the second surfaces are adjacent to the first surfaces,
wherein the second angle is different than the first angle, and
wherein the first and second surfaces are formed in a curved band concaving toward the first lateral side in a top view of the light guide plate.

3. The mobile terminal of claim 2, wherein the first surfaces inclined at the first angle and the second surfaces inclined at the second angle are alternatively arranged in the stepped unevenness formed in the rear surface of the light guide plate.

4. The mobile terminal of claim 1, wherein the mirror includes a plurality of inclined surfaces having an inclined angle in bilateral symmetry in a second direction vertical to the first direction.

5. The mobile terminal of claim 4, wherein light emitted from a first LED arranged in a center of the first lateral side of the light guide plate reaches the mirror in the same angle.

6. The mobile terminal of claim 1, wherein the display unit further comprises:
a reflector disposed behind the light guide plate and configured to reflect light passing through the light guide plate back through the light guide plate.

7. The mobile terminal of claim 6, wherein the reflector includes a plurality of inclined surfaces inclined toward the mirror.

8. The mobile terminal of claim 7, wherein the light having reached the inclined surfaces of the reflector is incident on the rear surface of the light guide plate at an angle smaller than a critical angle of the light guide plate and the light travels toward the liquid crystal panel after passing through the light guide plate.

9. The mobile terminal of claim 1, wherein an image is seen only when a view angle is in a preset range of angles in the secret display mode, wherein an image is seen dark when the view angle is out of the preset range of the angles in the power save mode, and wherein an image is seen at the same brightness regardless of the view angle in the wide view mode.

* * * * *